United States Patent [19]
Behrends

[11] Patent Number: 5,572,607
[45] Date of Patent: Nov. 5, 1996

[54] METHOD AND CIRCUIT ARRANGEMENT FOR ELECTRONIC RETOUCHING OF IMAGES

[75] Inventor: Rolf Behrends, Kiel, Germany

[73] Assignee: Linotype-Hell AG, Eschborn, Germany

[21] Appl. No.: 306,433

[22] Filed: Sep. 19, 1994

Related U.S. Application Data

[63] Continuation of Ser. No. 120,340, Sep. 14, 1993, abandoned.

[30] Foreign Application Priority Data

Sep. 30, 1992 [DE] Germany .......................... 42 32 704.0

[51] Int. Cl.[6] .................................................. G06K 9/40
[52] U.S. Cl. ........................................... 382/274; 358/531
[58] Field of Search .............................. 382/274, 191, 382/205; 358/500, 527, 530, 531, 518

[56] References Cited

U.S. PATENT DOCUMENTS

| | | | |
|---|---|---|---|
| 4,285,009 | 8/1981 | Klopsch | 358/76 |
| 4,328,515 | 5/1982 | Wellendorf | 358/80 |
| 4,393,399 | 7/1983 | Gast et al. | 358/80 |
| 4,476,487 | 10/1984 | Klie et al. | 358/531 |
| 4,486,772 | 12/1984 | Klie et al. | 358/80 |
| 4,506,382 | 3/1985 | Hada et al. | 382/27 |
| 4,516,155 | 5/1985 | Hennig | 358/80 |
| 4,617,592 | 10/1986 | MacDonald | 358/531 |
| 4,648,119 | 3/1987 | Wingfield et al. | 382/27 |
| 4,703,513 | 10/1987 | Gennery | 382/27 |
| 4,809,343 | 2/1989 | Wakabayashi et al. | 382/27 |
| 4,962,541 | 10/1990 | Doi et al. | 382/27 |
| 5,058,190 | 10/1991 | Levitt et al. | 382/27 |
| 5,111,286 | 5/1992 | MacDonald et al. | 358/500 |

FOREIGN PATENT DOCUMENTS

| | | | |
|---|---|---|---|
| 3110222A1 | 8/1982 | Germany | G03F 3/02 |
| 3110517C2 | 10/1983 | Germany | G03F 3/08 |
| 2858079C2 | 6/1987 | Germany | G03F 3/08 |

Primary Examiner—Joseph Mancuso
Assistant Examiner—Gerard Del Rosso
Attorney, Agent, or Firm—Hill, Steadman & Simpson

[57] ABSTRACT

A method and circuit arrangement for electronic retouching of color images is provided. The color signals of at least one color component acquired by pixel-by-pixel and line-by-line, trichromatic scanning of an original are digitized and stored as color values. The pixels of the color values to be retouched in the color image are marked by shifting a correction field that contains at least one dot element over the image region to be retouched, using the marking device of a coordinate acquisition unit. Before the retouch, a correction intensity distribution that achieves the desired retouch effect is declared for the correction field of the marking device. Correction intensity values allocated pixel-by-pixel are identified for the color values of the marked pixels of the color image and the color values to be retouched are modified by the correction intensity values under visual control. The correction intensity values to be utilized for the modification of the color values are thereby calculated by a maximum or minimum selection, as a result whereof the action of a real retouch brush is simulated.

6 Claims, 4 Drawing Sheets

METHOD AND CIRCUIT ARRANGEMENT FOR ELECTRONIC RETOUCHING OF IMAGES

This is a continuation of application Ser. No. 08/120,340, filed Sep. 14, 1993, now abandoned.

BACKGROUND OF THE INVENTION

The invention relates to the field of electronic reproduction technology and is directed to a method and to a circuit arrangement for electronic retouching of images, preferably color images.

In electronic color reproduction, three primary color signals (R, G, B) are acquired in a color scanner by pixel-by-pixel and line-by-line, optoelectronic scanning of color originals, these primary color signals representing the color components red, green and blue of the scanned pixels in the color originals. A color correction computer corrects the primary color signals according to the laws of subtractive color mixing into the color separation signals (Y, M, C, K) required for the production of the color separations "yellow", "cyan", "magenta" and "black", which are a measure for the quantities of ink required in the later printing process.

The color separation signals (Y, M, C, K) acquired in the color scanner are digitized and are intermediately stored in a memory for further processing with an electronic image processing system (EIP System). In the image processing system, the digitized color separation values (Y, M, C, K) of individual color originals can be united according to a layout plan to form the data set of an entire page and/or can be subjected to a partial retouch (modifications of chromaticity and/or tone). Partial retouches, i.e., retouches restricted to selectable, limited image regions, are required in order to optimize the corrections that occurred in the color correction computer of the color scanner or, on the other hand, to subsequently undertake editorial changes.

The color separation values (Y, M, C, K) modified in the image processing system are then supplied to a color separation recorder which records rastered or unrastered color separations point-by-point and line-by-line for producing the printing forms for the later printing process.

DE-C-29 20 058 corresponding to U.S. Pat. No. 4,393,399 already discloses a method for partial electronic retouch, whereby digital color values under visual control on a monitor are modified pixel-by-pixel and partially in accordance with the desired retouch effect in the color image or color separation by addition or subtraction of pixel-dependent correction intensity values. For that purpose, the locus coordinates of the pixels to be retouched, or their color values, and the respective degree of retouch are defined by the retoucher, by guiding the coordinate pen of a coordinate acquisition device across the image region to be retouched pixel-by-pixel like a conventional retouch brush. The coordinate pen marks the corresponding pixels and the degree of the retouch for every pixel, for example based on the number of times the pixel is touched with the coordinate pen, from the pressure of the coordinate pen on the pixel or from the dwell time of the coordinate pen on the pixel. In order to be able to more quickly retouch larger image regions, the correction field of the coordinate pen, and thus the number of pixels simultaneously marked can be enlarged, this corresponding to an enlargement of the "brush area" of the "electronic retouch brush."

In the known method, the correction intensity values at the various positions of the coordinate pen are respectively newly calculated into the color values. Such a method, however, more greatly simulates the employment of a stamp than it does the employment of a real retouch brush. A critical difference is comprised therein that an intensity difference that is always the same is calculated into the color values in such a calculation. Given a real retouch brush, however, there is an equilibrium between the retouch ink contained in a reservoir and the respective color application. The respective color output is thus dependent both on the retouch ink in the reservoir as well as on the intensity of the color already present in the color image. When, in the known method, the respective positions for calculating the correction values in are selected lying too far apart, then a chain-like series of brush impressions is produced in the color image to be retouched. When the positions, by contrast, lie too closely together, then a disturbing, chromatic cloud can be formed in the color image to be retouched. When the respective correction value calculations are undertaken in the pixel spacing, then a uniform structure in fact arises in the color image to be retouched, but a work situation that can no longer be simply surveyed with respect to case and effect arises for the retoucher.

It is therefore not adequately possible in the known method to simulate the properties of a real retouch brush. This essentially results therefrom that the operation of the correction intensities was hitherto implemented without taking color balancing events into consideration, as in the case of a real brush retouch.

SUMMARY OF THE INVENTION

It is therefore an object of the present invention to improve a method and a circuit arrangement for electronic retouching of images, preferably color images, such that uniform transitions of the color intensities in the retouched image are achieved and an optically simple monitoring of the retouch process is assured at the same time.

According to the invention, before the retouch, a correction intensity distribution that achieves a desired retouch effect is declared for a correction field of a marking means by allocating freely selectable correction intensity values to individual dot elements of the correction field and callably storing them. During the retouch, the marked pixels of the color image are checked in every position of the correction field to see whether a correction intensity value is already allocated to them or not. The respective pixel of the color image that is marked for the first time by a dot element of the correction field has the prescribed correction intensity value of the corresponding dot element of the correction field allocated to it. The previously allocated correction intensity value of a pixel is checked and potentially substituted given every repeated marking by a dot element of the correction field. The correction intensity value previously allocated to the pixel and the prescribed correction intensity value of the corresponding dot element of the correction field are compared to one another. A value derived from the comparison, and preferably an extreme value of the correction intensity value is compared to one another, is respectively re-allocated to the corresponding pixel and is employed as a correction value for the color value of the pixel. The invention shall be set forth in greater detail below with reference to FIGS. 1–7.

DESCRIPTION OF THE PREFERRED EMBODIMENTS

Figure 1:
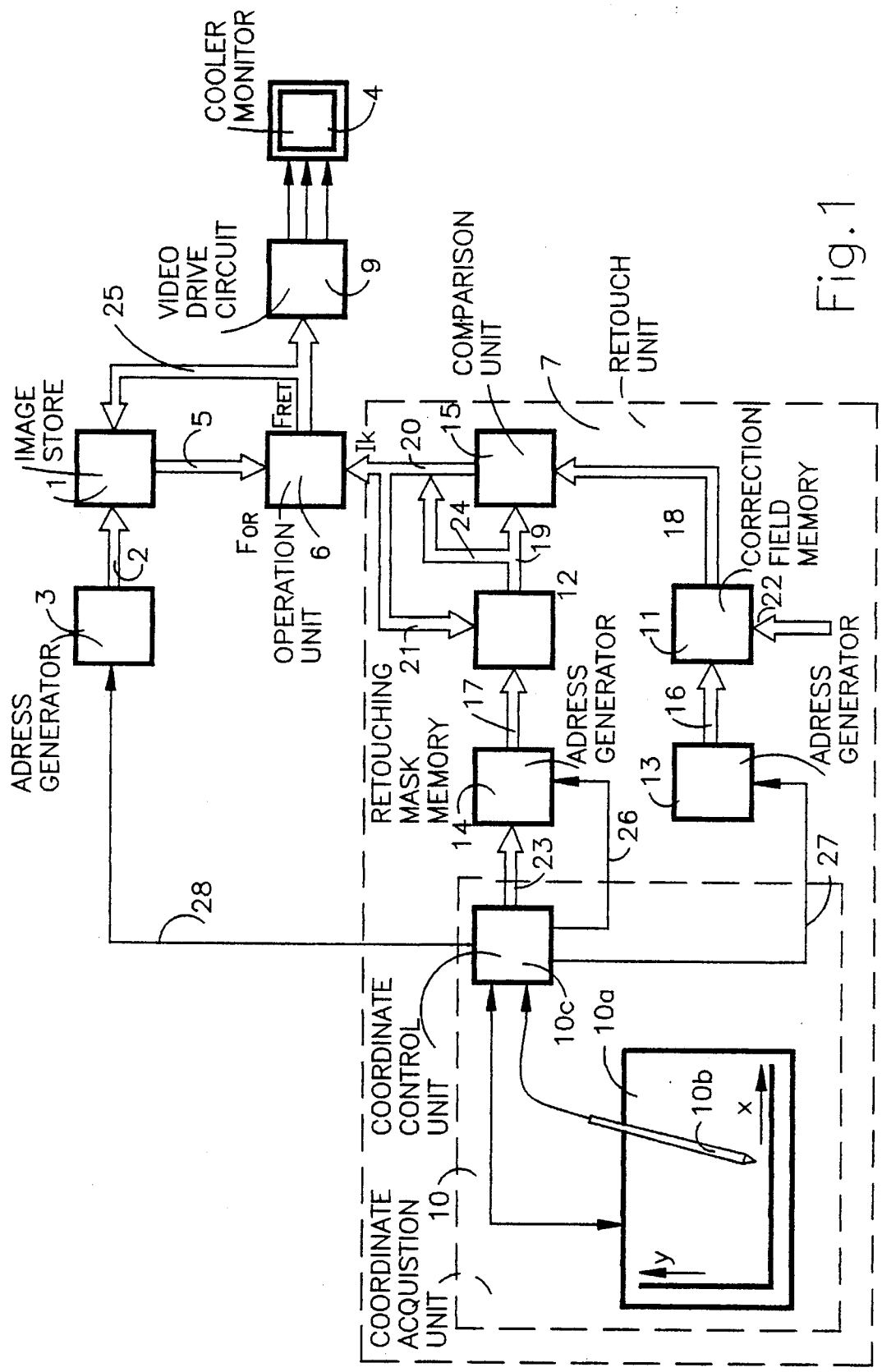
FIG. 1 is a schematic block circuit diagram of a circuit arrangement for electronic retouching of color images.

FIG. 1 shows a schematic block circuit diagram of a circuit arrangement for electronic retouching of color images. An image store 1 contains the original, digital color values $F_{OR}$ for the four color separations "yellow", "magenta", "cyan" and "black" of a color image to be retouched. The digital color values $F_{OR}$ having a word length of, for example, 8 bits can be the digitized, primary color signals $R_{OR}$, $G_{OR}$, $B_{OR}$ acquired in a color scanner, the color-corrected, digitized color separation signals $Y_{OR}$, $M_{OR}$, $C_{OR}$, $K_{OR}$ or other color-transformed, digitized color values. The original color values $F_{OR}$ were written into the image store 1 pixel-by-pixel via a databus 2 with the assistance of an address generator 3.

Before the recording of the color separations of the color image in a color separation recorder, individual color separations for the color image, i.e. all four color separations, are to be partially retouched under visual control in order to optimize the color correction or to undertake editorial color changes.

A color monitor 4 on whose picture screen an image composed of, for example, 1024×1024 pixels can be recorded is present for the visual control. The original color value $F_{OR}$ required for the presentation of the color image of an image excerpt of a color separation are called in with the assistance of the address generator 3 and is applied pixel-by-pixel via a databus 5 to, first, an operation unit 6 wherein the original color values $F_{OR}$ are operated to a selectable degree with the correction intensity values $I_K$ generated in a retouch unit 7 in order to form retouched color values $F_{RET}$. The retouched color values $F_{RET}$ are transferred via a further databus 8 into a video drive circuit 9 where they are converted into three analog drive signals r, g, b for the color monitor 4. The video drive circuit 9 contains a digital-to-analog converter (not shown), an image repetition store for generating a still picture on the color monitor 4 and a print simulation computer. The print simulation computer converts the supplied color values (taking the priorities of the multi-color printing into consideration) into the three drive signals r, g, b such that the color image presentation on the color monitor 4 conveys nearly the same chromatic impression as the multi-color print itself.

For example, a video drive circuit is described in greater detail in DE-C-29 20 058, and a print simulation computer is described in greater detail in DE-A-26 07 623.

The retouch unit 7 for producing the correction intensity values $I_K$ comprises a coordinate acquisition unit 10, a correction field memory 11, a retouching mask memory 12, address generators 13, 14 and a comparison unit 15. The address generators 13, 14 are connected via address buses 16, 17 to address inputs of the memories 11, 12. The comparison inputs of the comparison unit 15 are in communication via data buses 18, 19 with the data outputs of the memories 11, 12, and the resultant output of the comparison unit 15 is connected via a databus 20 to the operation unit 6 and is simultaneously fed back via a further databus 21 onto the data input of the retouch mask memory 12.

The comparison unit 15 can be switched to a maximum or a minimum selection in accordance with the desired retouch effect. In the exemplary embodiment, a maximum selection is to be carried out for the supplied values in the comparison unit 15.

The coordinate acquisition unit 10 is composed of a digitizing tablet 10a to which an $X_{RET}Y_{RET}$ of the pixels to be retouched in the color image are marked with the coordinate acquisition unit 10 in the $X_{RET}Y_{RET}$ coordinate system. For monitoring the retouch, a light mark generated in the video drive circuit 9 can be mixed into the picture screen of the color monitor 4, the motion thereof being synchronized with the motion of the coordinate pen 10b. Such a means is disclosed, for example, in DE-CE-29 20 058.

While the coordinate pen 10b respectively marks only one pixel and the locus coordinates $x_{ORET}$, $y_{ORET}$ thereof, the locus coordinates $x_{RET}y_{RET}$ of pixels that surround the marked pixel are also simultaneously calculated in the coordinate control unit 10c. The calculation of the locus coordinates $x_{RET}$, $y_{RET}$ of these pixels occurs from the locus coordinates $x_{ORET}$, $y_{ORET}$ of the respective, marked, central pixel, and the pixel spacing from the central pixel. This measure corresponds to an increased range of effect of the coordinate pen 10b or, respectively, to an enlarged correction field (brush area) of the retouch brush. Size and shape of the correction field can be defined by the retoucher.

Figure 2:
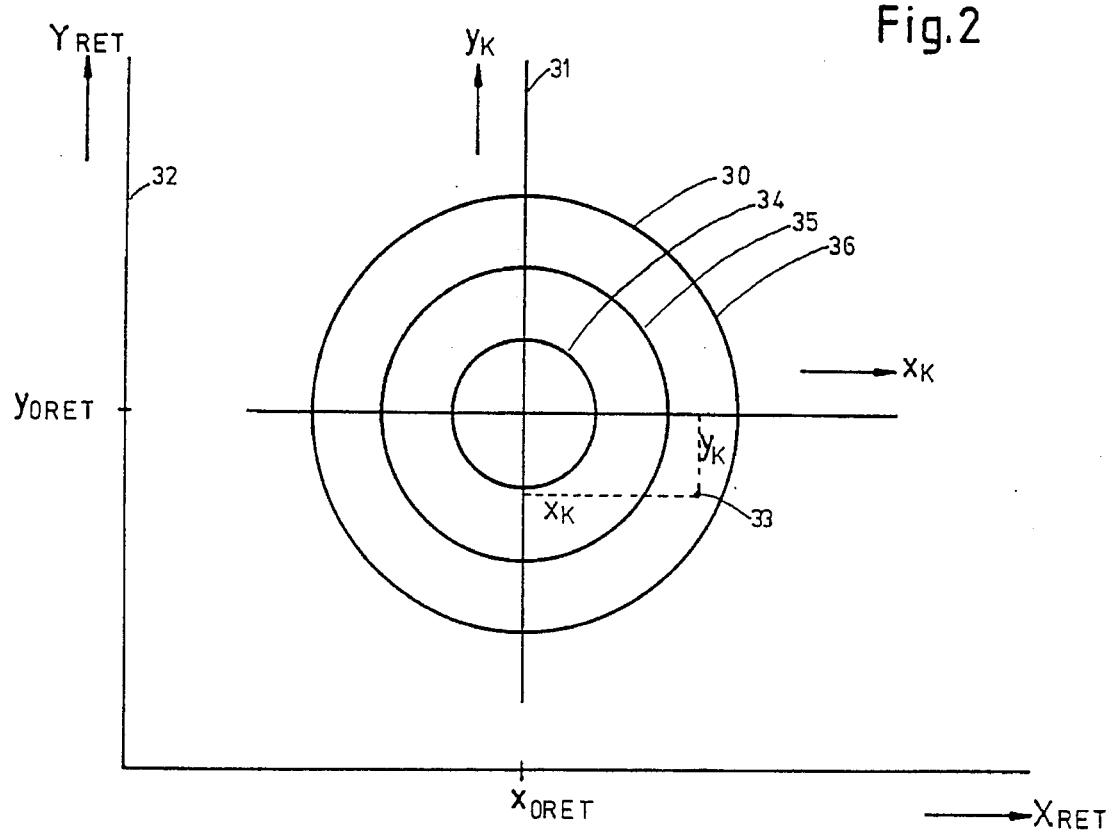
FIG. 2 is a graphic illustration of the correction field of a coordinate pen.
Figure 3:
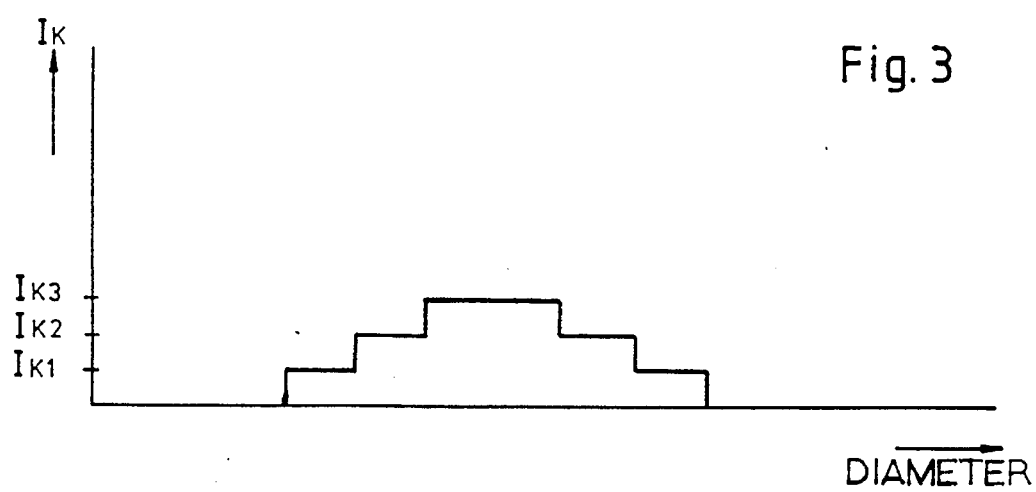
FIG. 3 illustrates an intensity profile of a correction field.

Before the retouch, a correction intensity distribution that defined the retouch effect is defined for the correction field of the coordinate pen 10b. For this purpose, the correction field is subdivided into dot elements (pixels), and a digital correction intensity value $I_K$ is allocated to every dot element within the correction field or to its locus coordinates $x_K$, $y_k$ in an $x_K y_K$ coordinate system allocated to the correction field (FIGS. 2 and 3). The digital correction intensity values $I_K$, for example, have a word length of 8 bits, so that 254 values can be assigned.

The defined, digital correction intensity values $I_K$ of the correction field are written pixel-by-pixel into the correction field memory 11 via a data input 22, this memory being oriented according to the $x_K y_K$ coordinate system and are stored therein in addressable fashion by the locus coordinates $x_K$, $y_K$ of the allocated dot elements of the correction field. The addresses corresponding to the locus coordinates $x_K$, $y_K$ are generated by the address generator 13 and are supplied to the correction field memory 11 via the address bus 16. The memory capacity of the correction field memory 11 is designed such that the digital correction intensity values $I_K$ of the largest possible correction field of the coordinate pen 10b can be stored.

The retouch mask memory 12 is oriented according to the $x_{RET}$, $y_{RET}$ coordinate system. The addresses corresponding to the locus coordinates $x_{RET}$, $y_{RET}$ are generated by the address generator 14 and are conducted to the retouch mask memory 12 via an address bus 17. The memory locations are first occupied with "zeroes."

In the retouch process, the retoucher guides the coordinate pen 10b like a retouch brush across that region of the digitization tablet 10a that corresponds to the image region to be retouched in the color image. During the motion of the coordinate pen 10b, the locus coordinates $x_{RET}, y_{RET}$ of the pixels within the correction field in the current positions of the coordinate pen 10b are continuously identified by the coordinate control unit 10c of the coordinate acquisition unit 10, are communicated via an address bus 23 to the address generator 14 and are converted in the latter into the corresponding address of the retouch mask memory 12. The correction intensity values $I_K$ deposited under the addresses that are called in are read out via the data output of the retouch mask memory 12 and are supplied via the databus 19 to the one comparison input of the comparison unit 15.

At every position the coordinate pen 10b assumes on the digitization table 10a, the correction intensity values $I_K$ of the individual dot elements of the correction field that are deposited in the correction field memory 11 are also simultaneously called in pixel-by-pixel by the address generator 13. The correction intensity values $I_K$ that are called in are read out via the data output of the correction value memory 11 and are supplied via the databus 18 to the other comparison input of the comparison unit 15.

The correction intensity values $I_K$ read out from the two memories 11, 12 in every current position of the correction field are compared to one another in view of the maximum value in the comparison unit 15. The maximum correction intensity values $I_K$ are then returned via the databus 21 to the data input of the retouch mask memory 12 and are stored therein, instead of the correction intensity values $I_K$ previously deposited therein. The corresponding correction intensity value $I_K$ of the correction field memory 12 is thereby respectively stored at all called-in memory locations of the retouch mask memory 12 that are occupied with a "zero", since the corresponding correction intensity value $I_K$ of the correction field memory 12 is always the maximum correction intensity value $I_K$ when compared to "zero."

A distribution of accumulated correction intensity values $I_K$ corresponding to the individual positions of the correction field along the retouching paths is stored in the described way in the retouch mask memory 12, these accumulated correction intensity values $I_K$ being inventively employed for controlling the desired modifications in the color image.

For visual control of the retouch result, the correction intensity percentage values $I_K$ found to be maximum in the comparison unit 15 are directly forwarded via the databus 20 to the operation unit 6 and are operated therein (to a selectable degree between $I_K=0$ and $I_K=100\%$) with the original color values $F_{ORG}$ read out from the image store 1, but without the original color values $F_{ORG}$ in the image store 1 being initially substituted by the retouched color values $F_{RET}$.

The operation of the original color values $F_{ORG}$ with the correction intensity percentage values $I_K$ to form the retouched color values $F_{RET}$ occurs in the operation unit 6 according to a prescribed mixing function $f_{mixing}$ such that either the uncorrected, original color values $F_{ORG}$, given $I_K=0$, the fully corrected color values $F_{RET}$, given $I_K=100\%$, or color values $F_{RET}$ having an arbitrary correction ratio between the fully corrected and the uncorrected color values are output from the operation unit 6 i.e. $F_{RET}=f_{mixing}(I_K, F_{ORD})$.

Only after the complete termination of the retouch are the correction intensity values $I_K$ again directly read out by a databus 24, bypassing the comparison unit 15, and supplied to the operation unit 6 via the databus 20. The retouched color values $F_{RET}$ are then fed back from the output of the operation unit 6 via a databus 25 to the data input of the image store 1 and are written into the image store 1 with the assistance of the address generator 3, the original color values $F_{ORG}$ stored in said image store 1 being potentially replaced.

The read-out of the correction intensity values $I_K$ from the correction field memory 11 and from the retouch mask memory 12 and the re-storing of the maximum correction intensity values $I_K$ into the retouch mask memory 12 are synchronized in that the address generators 13, 14 are supplied with corresponding control signals by the coordinate control unit 10c via control lines 26, 27.

For a pixel-precise operation of the correction intensity values $I_K$ with the original color values $F_{ORG}$ of the image store 1 in the operation unit 6, the address generator 3 is additionally synchronized via a further control line 28.

The behavior of a real retouch brush with respect to the application of the retouch color, which only outputs retouch color at the locations at which the background does not yet have adequate color saturation, is advantageously simulated by the described retouch method having a maximum selection of the correction intensity values. In this way, an adequately close sequence of retouching steps can be realized without having to fear a disturbing formation of clouds in the retouched color image due to intensity superimpositions.

A dry, real retouch brush picking up fresh retouch ink can be preferably simulated by a corresponding minimum selection of the correction intensity values $I_K$ in the comparison unit 15. The resulting correction intensity value $I_K$ for a pixel is thereby respectively equal to the correction intensity value $I_K$ deposited in the retouch mask memory 12 when the correction intensity value stored therein is lower than the corresponding correction intensity value $I_K$ of the correction field deposited in the correction field memory 11; otherwise, it is equal to the correction intensity value $I_K$ deposited in the correction field memory 11.

A drawing of the retouch color can be simulated by calculating the correction intensity values $I_K$ into the original color values $F_{ORG}$ and by subsequent erasure of the retouch mask memory 12, whereby the application of new retouch color can be simulated with the next retouch step, so that the effects of the individual retouch steps accumulate.

FIG. 2 shows a correction field 30 of the coordinate pen 10b that is assumed to be circular. The $X_K Y_K$ coordinate system 31 allocated to the correction field 30 runs through the center of the circle. The $X_K Y_K$ coordinate system 31 shifts with the motion of the coordinate pen 10b within the $X_{RET} Y_{RET}$ coordinate system 32 allocated to the digitization tablet 10a.

A digital correction intensity value $I_K$ is allocated to every pixel 33 within the correction field 30 having the locus coordinates $x_K$, $y_K$. In the exemplary embodiment, the correction field 30 is subdivided into a central circle and into two circular rings lying around the circle. The respectively same, digital correction intensity value $I_K$ is allocated to the pixels lying within the central circle and to the pixels lying within the circular rings, so that level areas 34, 35, 36 having the respectively same intensity result. For example, a high correction intensity value $I_{K3}$ is allocated to the circular level area 34, a medium correction intensity value $I_{K2}$ is allocated to the middle, annular level are 35, and a low correction intensity value $I_{K1}$ is allocated to the outer, annular level area 36. A stepped intensity profile, which is shown in FIG. 3, then results over the diameter of the circular correction field 30. The intensity profile can be selected according to an arbitrary function, for example according to a gauss function.

Figure 4:
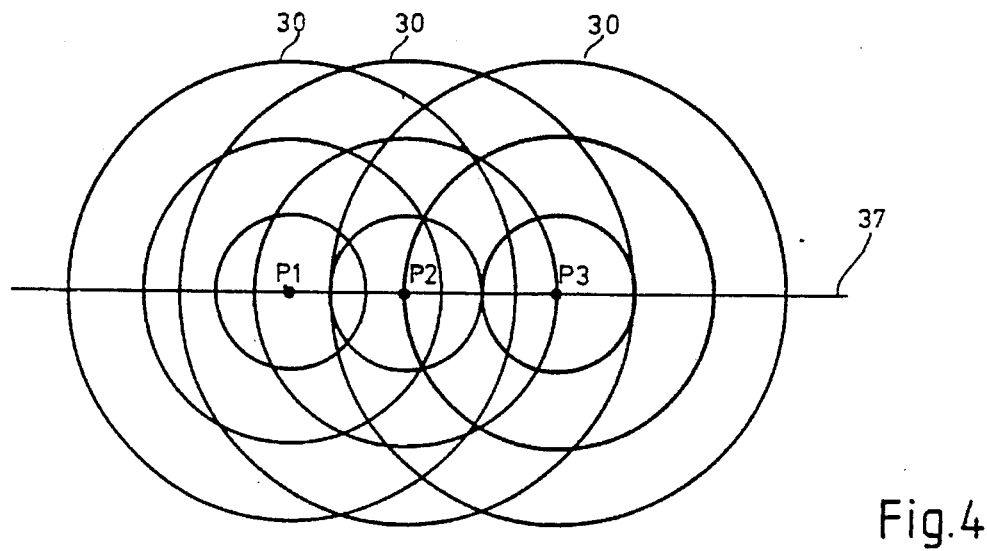
FIG. 4 is a schematic illustration directed to the superimposition of correction intensity values in various positions of the correction field.

The correction field 30 is shown in FIG. 4 in three different positions $P_1$, $P_2$, $P_3$ of the coordinate pen 10b along a retouch path 37.

Figure 5:
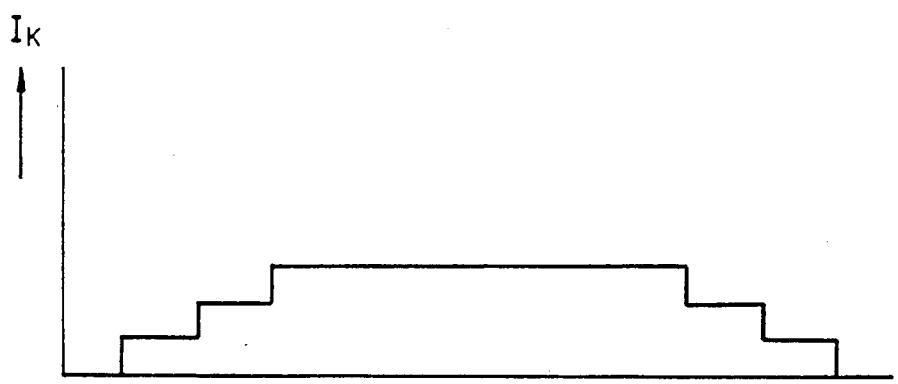
FIG. 5 is an illustration of the curve of the resulting correction intensity values given operation of the correction intensity values via a maximum function.

FIG. 5 shows the curve of the resulting correction intensity values $I_K$ along the retouch path 37 given operation of the correction intensity values $I_K$ via a maximum function. The result is a uniform retouch effect along the retouch path 37.

Figure 6:
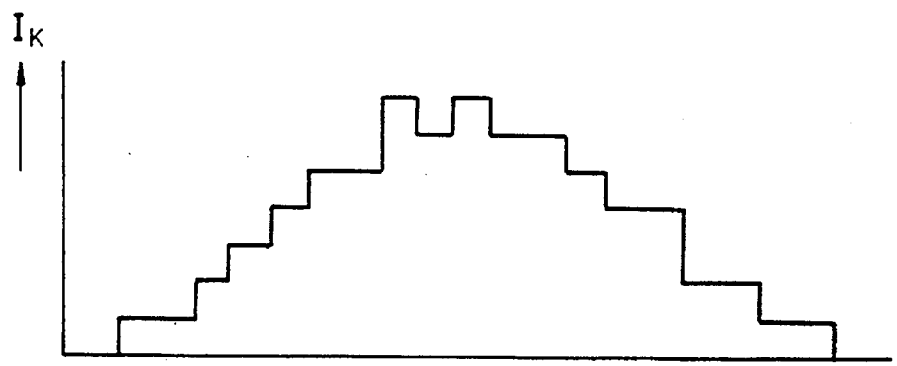
FIG. 6 is an illustration of the curve of the resulting correction intensity values given additive operation of the correction intensity values of the prior art.

FIG. 6 shows the corresponding curve of the resulting correction intensity values $I_K$ given additive operation of the correction intensity values $I_K$ according to the prior art.

Figure 7:
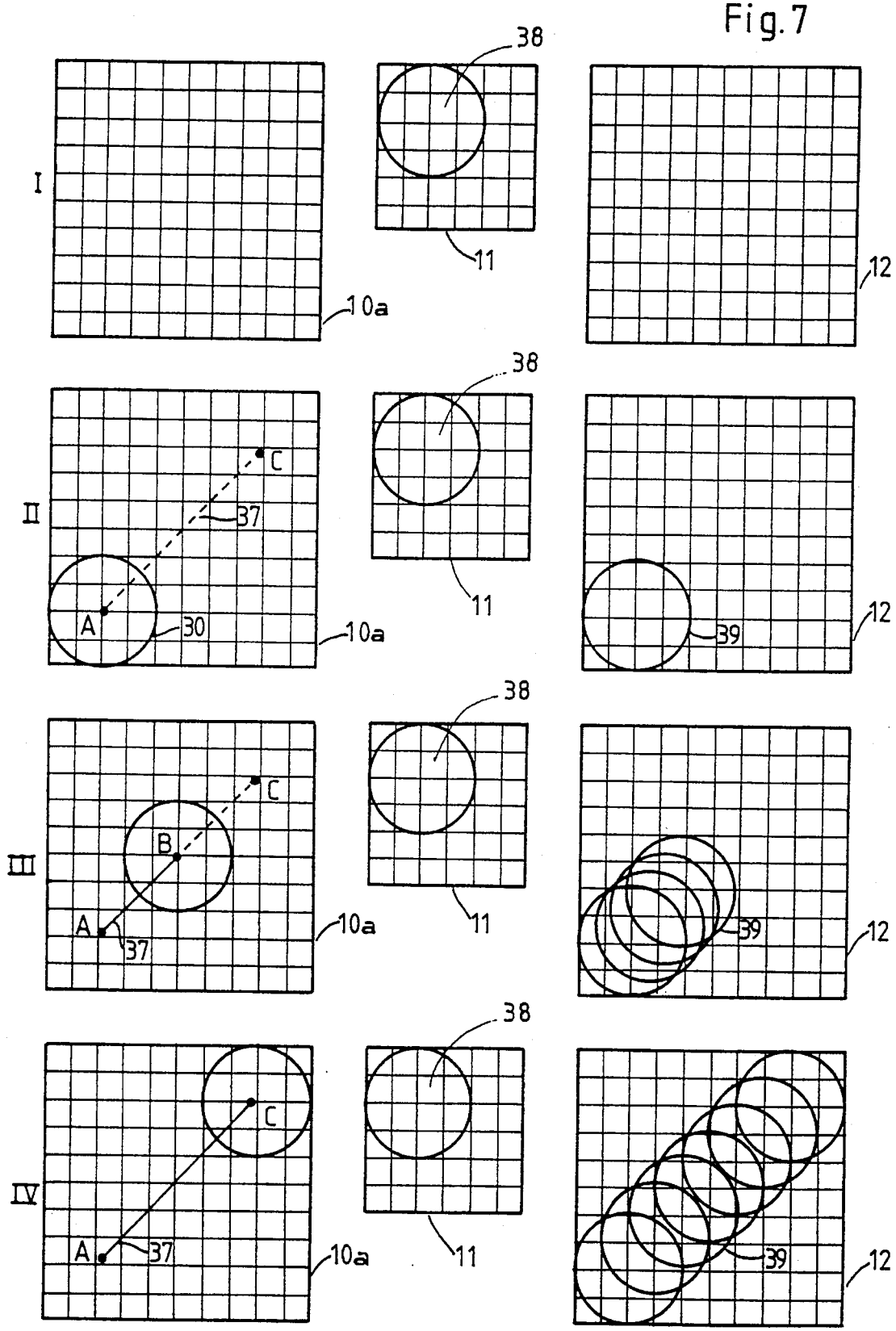
FIG. 7 illustrates the path of the retouch method shown in a graphic illustration.

FIG. 7 is intended to explain the course of the retouch method in the individual phases I–IV again with reference to a graphic illustration.

The digitization tablet 10a of the coordinate acquisition unit 10, the correction field memory 11 and the retouch mask memory 12 are symbolically respectively shown in the individual phases I–IV.

Before the retouch (Phase I), the correction intensity values $I_K$ that were prescribed for the presumably circular correction field 38 are loaded into the correction field memory 11. The memory locations that are thereby occupied are indicated by a circle 38 corresponding to the correction field 30; the memory locations that are not occupied are occupied with "zeroes." All memory locations of the retouch mask memory 12 are likewise still occupied with "zeroes" at this time.

The retouch effect along the retouch path 37 from point A to point C begins in phase II, in that the retoucher first places the coordinate pen 10b onto the point A of the digitization 10a. The correction intensity values $I_K$ of the correction field 30 are now overwritten from the correction field memory 11 directly into the memory area of the retouch mask memory 12 indicated by the circle 39, this corresponding to the position of the correction field 30 on the digitization tablet 10a in the position A of the coordinate pen 10b. An overwriting occurs because all memory locations of the retouch mask memory 12 are still occupied with "zeroes" at this time and the correction intensity values $I_K$ stored in the correction field memory 11 are thus always the maximum values.

In Phase III, the coordinate pen 10b moves from the position A into the position B. The correction intensity values $I_K$ of the correction field 30 are respectively read out from the correction field memory 11 in the individual intermediate positions. Likewise, the corresponding correction intensity values $I_K$ of those memory areas of the retouch mask memory 12 that correspond to the intermediate positions of the correction field 30 along the retouch path 37 between the positions A and B are read out. The correction intensity values $I_K$ read out from the two memories 11, 12 are checked in view of the maximum values and the maximum correction intensity values $I_K$ are written back onto the positionally allocated memory locations of the retouch mask memory 12, whereby the entries present at the memory locations are erased. The memory areas thereby affected are indicated by the overlapping circles 39.

In Phase IV, the retoucher has guided the coordinate pen 10b on the digitization tablet 10a up to the position C of the retouching path 37 and the retouch mask memory 12 has been correspondingly written. After this, the retouch event can be continued along any desired retouch path.

Although various minor changes and modifications might be proposed by those skilled in the art, it will be understood that I wish to include within the scope of the patent warranted hereon all such changes and modifications as reasonably come within my contribution to the art.

I claim as my invention:

1. A method for electronic retouching of a color image, comprising the steps of:

scanning an original color image pixel-by-pixel to acquire color signals, digitizing the color signals into color values and storing said color values as original color values in an image store;

identifying coordinates of individual pixels for a correction field of original color values to be retouched in said image store by means of a marking device of a coordinate acquisition unit, said marking devices being used as a retouch brush and said correction field representing a size of said retouch brush;

defining correction intensity percentage values for said field of color values to be retouched and storing the defined correction intensity percentage values in a correction field memory of said coordinate acquisition unit;

simultaneously addressing said correction field memory and a retouching mask memory for storing correction intensity percentage values at corresponding locations by use of the coordinates identified with said marking device of said coordinate acquisition unit;

selecting in a comparison unit an extreme of an addressed correction intensity percentage value read out from said correction field memory and a simultaneously addressed correction intensity percentage value read out from said retouching mask memory;

correcting the original color values to be retouched in the image store by said selected correction intensity percentage values; and feeding back said selected correction intensity percentage values from said comparison unit into said retouching mask memory to update the retouching mask memory to the selected correction intensity percentage values at currently addressed locations by said identified coordinates for subsequent selection of correction intensity percentage values by said comparison unit.

2. A method according to claim 1 wherein the comparison unit selects as said extreme the greater of the correction intensity percentage value read from said retouching mask memory or the correction intensity percentage value read from said correction field memory.

3. A method according to claim 1 wherein the comparison unit selects as said extreme the smaller of the correction intensity percentage value read from said retouching mask memory or the correction intensity percentage value read from said correction field memory.

4. A system for electronic retouching of color images, comprising:

an image store for storing original color images;

a coordinate acquisition unit having a marking device for identifying coordinates of individual pixels for a correction field of original color values to be retouched in said image store, said marking device being used as a retouch brush and said correction field representing a size of said retouch brush;

a retouching mask memory and a correction field memory for storing correction intensity percentage values, said coordinate acquisition unit simultaneously controlling addressing of said correction field memory, said retouching mask memory, and said image store;

said correction field memory having an input for defining digital correction intensity percentage values for said field of color values to be retouched;

a comparison unit for selecting an extreme of a currently addressed correction intensity percentage value input to it from said correction field memory and a currently addressed correction intensity percentage value input to it from said retouching mask memory, and for feeding said selected correction intensity percentage values from said comparison unit back to said retouching mask memory for updating addressed correction intensity percentage values therein; and an operating unit for correcting said original color values to be retouched in the image store by said selected correction intensity percentage values in said comparison unit.

5. A system according to claim 4, wherein the comparison unit selects as said extreme the greater of the currently addressed correction intensity percentage value input from said retouching mask memory and the currently addressed correction intensity percentage value input from said correction field memory.

6. A system according to claim 4, wherein the comparison unit selects as said extreme the smaller of the currently addressed correction intensity percentage value input from said retouching mask memory and the currently addressed correction intensity percentage value input from said correction field memory.

* * * * *